United States Patent [19]

Neumann

[11] Patent Number: 4,722,114
[45] Date of Patent: Feb. 2, 1988

[54] CASTER DEVICE

[75] Inventor: Manfred Neumann, Radevormwald, Fed. Rep. of Germany

[73] Assignee: Tente-Rollen GmbH & Co., Wermelskirchen, Fed. Rep. of Germany

[21] Appl. No.: 837,619

[22] Filed: Mar. 7, 1986

[30] Foreign Application Priority Data

Sep. 6, 1985 [DE] Fed. Rep. of Germany ....... 3531824

[51] Int. Cl.$^4$ .............................................. B60B 33/00
[52] U.S. Cl. .................................................. 16/35 R
[58] Field of Search ...................... 16/35 R; 188/1.12

[56] References Cited

U.S. PATENT DOCUMENTS

| 3,988,800 | 11/1976 | Sachser | 16/35 R |
| 4,349,937 | 9/1982 | Fontana | 16/35 R |

FOREIGN PATENT DOCUMENTS

| 2520097 | 11/1976 | Fed. Rep. of Germany | 16/35 R |
| 3301240 | 7/1984 | Fed. Rep. of Germany | 16/35 R |
| 2055041 | 2/1981 | United Kingdom | 16/35 R |
| 2098473 | 11/1982 | United Kingdom | 16/35 R |

Primary Examiner—E. R. Kazenske
Assistant Examiner—James L. Wolfe
Attorney, Agent, or Firm—Martin A. Farber

[57] ABSTRACT

A caster device with blocking of rotation of the caster wheel and of swiveling movement of a caster-wheel fork by displacement of a spindle which is disposed concentric to the swivel axis of the caster-wheel fork, the spindle being displaceable along the axis and passing through a head plate of the fork, there being a mounting plate disposed above the head plate; and wherein the lower end of the spindle, upon initial displacement to a first position blocks a swiveling motion of the caster-wheel fork by tooth engagement therewith and, after a second displacement to a second position, blocks rotation of the caster wheel by means of a breaking action on an impact surface. A device activated by the spindle blocks the swiveling motion of the fork and a device activated by the spindle blocks rotation of the caster wheel. Each of the blocking a device is bringable into engagement separately from each other to a depth of engagement which is individually adjustable.

11 Claims, 13 Drawing Figures

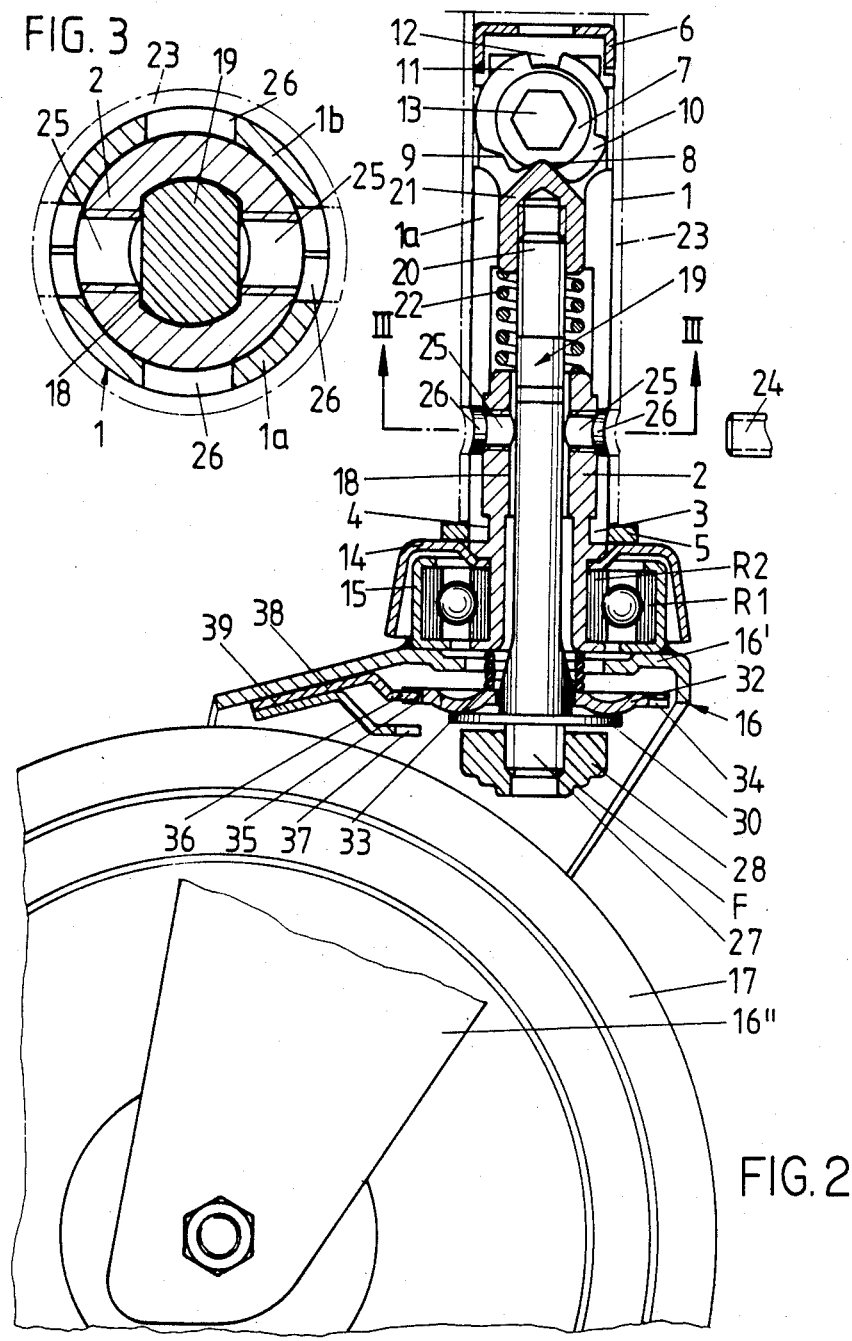

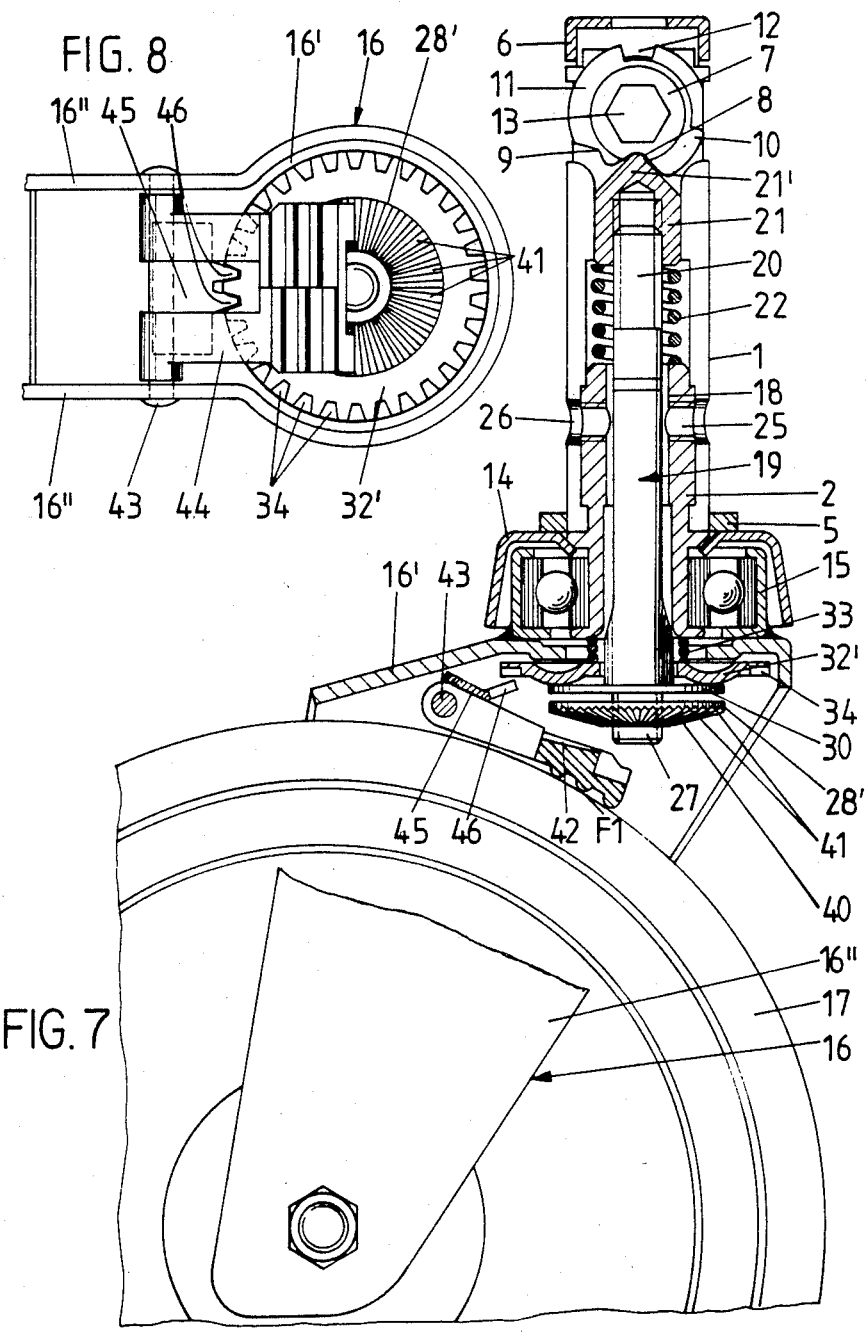

CASTER DEVICE

FIELD AND BACKGROUND OF THE INVENTION

The present invention relates to a caster device with blocking of the rotation of the caster wheel and of the swiveling movement of the caster-wheel fork by displacement of a spindle which is arranged concentric to the swivel axis of the caster-wheel fork, is displaceable and passes through the head plate of the fork and the mounting plate arranged above same; the lower end of the spindle, upon initial displacement, blocks the swiveling motion of the caster-wheel fork by tooth engagement with it and, after a second displacement, brakes the caster wheel by means of an impact surface.

In one known development of this type the spindle bears at its lower end, located within the caster-wheel fork, a disk which is toothed on its broad surface, the toothing thereof facing the toothing of a brake lever which is mounted on the caster-wheel fork. By means of a shift projection which acts on the upper end of the spindle, the spindle can then be displaced stepwise in the direction towards the brake lever. When the spindle has been displaced by one step so as to block the swiveling motion of the caster-wheel fork, the toothing of the disk engages into the toothing of the brake lever without thereby exerting a braking action on the caster wheel. Unevennesses on the caster wheel can, however, lead to disturbances in operation, so that in such case the turning movement of the caster wheel is then also braked for a short time. If the diameter of the caster wheel decreases as the result of wear, there is not sufficient engagement between the toothing of the brake lever and the toothing of the disk so that there is insufficient blocking of the swiveling motion of the caster-wheel fork.

SUMMARY OF THE INVENTION

It is an object of the invention so to develop a caster device of the aforementioned type, in a manner simple to manufacture, that definite blocking positions for the caster wheel and for the swiveling motion of the caster-wheel fork can be obtained independently of the caster wheel and, in particular, independently of the diameter thereof as determined by wear, etc.

According to the invention, the two blocking positions are obtained by means which can be brought into engagement separately from each other, and whose depth of engagement is individually adjustable.

As a result of this development a caster device of the above-mentioned type, and which is of increased value in use, is obtained. In contradistinction to the state of the art where the two blocking positions are obtained by the shifting in succession of the means which are adapted to be brought into engagement, this is now done by means which can be brought into engagement in parallel. This means that the corresponding blocking positions are independent of each other. If, for instance, only the swivel motion of the caster-wheel fork is blocked the caster wheel itself cannot exert any influence on this blocking position. The reliability in operation of the caster wheel is thus increased. Even if the spindle should be adjustable, i.e. its length variable, the reliability in operation is not impaired.

The toothed disk which is associated in non-turnable manner with the spindle serves exclusively to block the swivel motion of the caster-wheel fork. Upon displacement of the spindle it is therefore possible to produce exclusively tooth engagement between the toothed disk and the mating teeth of the caster-wheel fork without impairing the rotation of the caster wheel. Only upon the second displacement of the spindle does the impact surface on the fork head plate side come either directly or indirectly, into the braking position for the caster wheel, both blocking positions being thus obtained. In this case also, displacement of the corresponding means which effect the blocking of the caster wheel can be effected so that adaptation to the diameter of the caster wheel is made possible.

A variant is characterized by the fact that the position of release corresponds to an intermediate position of the spindle. If the spindle is displaced in the direction away from the caster wheel the blocking of the caster-wheel fork is effected. Displacement of the spindle in the other direction then leads to the blocking position for both the caster-wheel fork and the caster wheel. In order that the toothed disk which is carried along by the spindle can effect the corresponding blocking, the edge teeth can in this connection be brought into engagement with the mating teeth present on two planes of the caster-wheel fork.

In order to obtain a dependable position of blocking of the caster-wheel fork, the tooth arranged on the higher plane is a large mating tooth. Should the corresponding upward displacement of the spindle have taken place and the mating tooth not yet have entered into the tooth gap associated with it then, upon further swinging of the caster-wheel fork the mating tooth comes into alignment with the corresponding tooth gap and then permits the tooth engagement.

In order that the larger mating tooth can enter solely into the appropriate larger tooth gaps, the inside engagement space of these tooth gaps corresponds to a multiple of the space taken up by the other mating teeth. The radially open development of the engagement space for the larger mating tooth makes it possible to bring the spindle from this blocking position directly into the position of release or into the caster-wheel blocking position in which the smaller mating teeth enter into action with respect to the toothed disk. The spring mounting of the disk makes it possible to maintain optimum blocking positions despite displacement of the spindle. Adjustment is effected most favorably by a screw thread. A nut present at the free end of the spindle increases or decreases the effective length of the spindle by its rotation.

In case of the provision of two swivel-motion blocking positions of the disk, it is found favorable to provide the disk with tooth engagement means on its two opposite wide sides. The tooth engagement means provided on its upper wide side then cooperate with tooth engagement gaps of the head plate of the caster-wheel fork so that larger forces are taken up without danger. This corresponds to the position of the fork in rough angular graduation. Displacement of the disk from the release position into the other blocking position then leads to a blocked position of the fork in finer angular graduation. The edge teeth of the disk which are provided on its lower broad side then cooperate with the mating teeth of the spring plate. At the same time, rotation of the caster wheel is braked also in this position. By means of the brake nut which is adjustable by thread on the end of the spindle, optimum adjustment of the brake pressure is obtained, independently of the blocking of the disk.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 2 is a longitudinal section corresponding to FIG. 1 but with only the caster-wheel fork blocked;

FIG. 3 is a section along the line III—III of FIG. 2;

FIG. 7 is a longitudinal section through the caster device according to the second embodiment, seen in the position of release of the caster-wheel fork and of the caster wheel;

FIG. 8 is a bottom view of FIG. 7, with the caster wheel omitted;

DETAILED DESCRIPTION OF THE PREFERRED EMBODIMENTS

Figure 1:
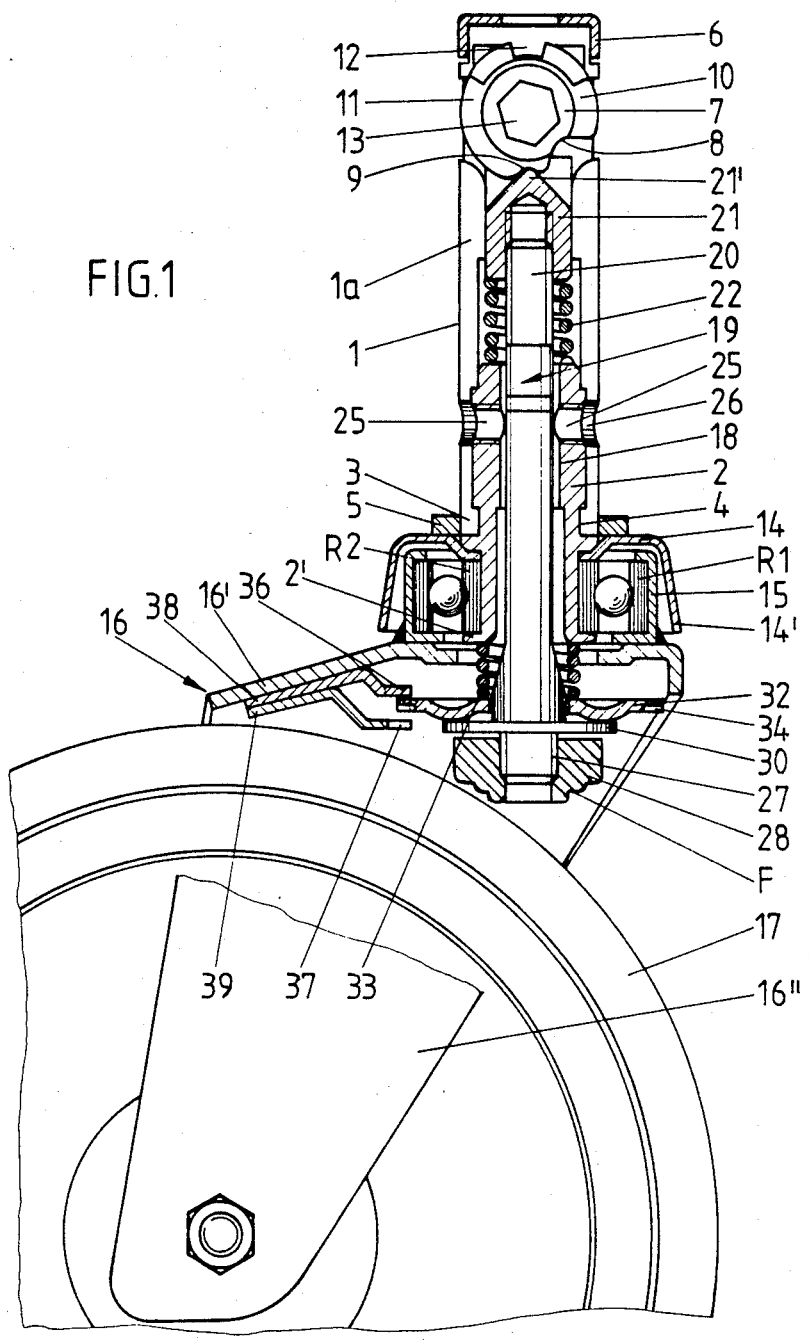
FIG. 1 is a longitudinal section through the caster device according to the first embodiment, showing the intermediate position in which neither caster-wheel fork nor caster wheel is blocked.

The caster device shown in FIGS. 1 to 6, is of the type which can be placed in the transportable frames of hospital beds, carts, etc. The caster device has a plug-in sleeve 1 consisting of two half shells 1a and 1b which are developed identical to each other. Said sleeve is seated turnably on a pin 2. The plug-in sleeve 1 is made axially immovable with respect to said pin in the manner that an inward-directed collar 3 on the edge of the plug-in sleeve 1 engages into an annular groove 4 in the pin 2. The engagement is maintained by a ring 5 which, lying at the same height, surrounds the half-shells 1a, 1b. A cup-shaped ring 6 is placed over the other end of the two half-shells 1a, 1b. Both rings 5 and 6 are pushed on by way of a force fit.

A shift cam 7 is mounted in the upper region of the two half-shells 1a, 1b of the plug-in sleeve 1. On its periphery it has detent niches 8, 9 of different depth such that the depth of the detent niche 8 is greater than that of the detent niche 9. Furthermore, stops 10, 11 are arranged diametrically opposite each other on the switch cam 7, said stops, in cooperation with a mating stop 12 on the inside limiting the rotation of the shift projection cam 7. A polygonal opening 13 for an operating tool (not shown) is provided centrally in the shift cam 7.

The aforementioned pin 2 is seated in non-turnable manner in the center of a circular mounting plate 14 from which a circumferential downward-directed rim 14' extends. The rim extends over a bearing housing 15 which receives a ball bearing. The bearing housing is of annular shape and is welded to the fork head plate 16' of a caster-wheel fork 16. The outer ring R1 of the ball bearing is embedded in the bearing housing 15 while the inner ring R2 is seated fixed on the pin 2. Thus the caster-wheel fork 16 can turn relative to the pin 2 and the mounting plate 14.

The fork head plate 16' is continued by two fork arms 16'' which support a caster wheel 17 for rotation between them.

The pin 2 forms a non-round mounting opening 18 in which a spindle 19 which is flattened on both sides is guided in non-rotatable but longitudinally displaceable manner. The upper end of the spindle 19 is shaped to form a threaded pin 20. A nut 21 of polygonal cross section is screwed onto said pin, the nut in its turn being mounted fixed against rotation but longitudinally displaceable in a recess in the half shells 1a, 1b. The end 21' of the nut facing the shift cam 7 is of ridge shape and engages into the detent niche 9, as shown in FIG. 1. This engaged position is maintained by a compression spring 22 arranged on the spindle 19, one end of said spring resting against the end of the pin 2 and the other end resting against the lower end of the nut.

In FIG. 2, there is shown in dash dot line a tubular leg 23 of a hospital bed, not shown, into which the plug-in sleeve 1 engages. The inserted position of the sleeve 1 can be fixed by screws 24. For this purpose, two diametrically opposite threaded holes 25 are provided in the pin 2 and four transverse openings 26 arranged an equal distance apart are provided in the half-shells 1a, 1b. Two of said transverse openings extend over the joint between the two half-shells 1a, 1b. The effective length of the spindle 19 can be lengthened or shortened by turning the plug-in sleeve 1 relative to the pin 2. Tightening is then effected by means of the screws 24.

The spindle 19 which passes through the fork head plate 16' is so shaped on the end thereof facing the caster wheel 17 as to form a threaded pin 27. A brake nut 28 consisting of abrasion-resistant plastic is seated on it. The impact surface thereof which faces the circumference of the caster wheel 17 is stepped and represents the braking surface F. As shown in FIG. 1 it lies at a slight distance in front of the circumferential surface of the caster wheel 17 so that the turning of the latter is not impeded. The brake nut 28 is seated with a large amount of friction on the threaded pin 27 so that unintentional turning of the brake nut 28 does not occur. By intentional screwing, the position of the brake nut 28 and thus the braking force can be varied.

Adjoining the threaded pin 27 is a collar 30. From the latter there extend drive projections 31 pointing in the direction of the fork head plate 16' and arranged diametrically opposite each other, they engage in corresponding openings 29 in a disk 32 seated on the spindle 19. A compression spring 33 which surrounds the spindle 19 urges the disk 32 in the direction towards braking surface F, which also represents the impact surface. The other end of this compression spring 33, which is weaker than the compression spring 22, rests against the lower flanged end 2' of the pin 2. The lower broad surface of the disk 32 has on its edge teeth 34 developed as open pockets. They extend approximately over half the thickness of the disk 32. Furthermore, diametrically opposite each other there are provided on this disk 32 two tooth gaps 35 the engagement space of which is radially open and therefore extends over the thickness of the disk and corresponds to a multiple of the teeth 34.

The edge 34 and tooth gaps 35 can be brought into engagement with two mating teeth 36, 37 which are arranged in different planes, lying one above the other. These teeth 36, 37 are of different shape from each other. The mating tooth 36 lying above the mating teeth 37 is larger and corresponds in its contour to the inner engagement space of the tooth gap 35 which furthermore corresponds to a multiple of the space taken up by the other mating teeth 37. The mating tooth 36 is seated on an extension 38. The other mating teeth 37 are also located on an extension 39, the two extensions 38, 39 being fixed in suitable manner to the inner side of the wheel fork head plate.

As shown in FIG. 1, the spindle 19 assumes such a position that the edge of the disk 32 lies in the region between the larger mating tooth 36 and the other mating teeth 37. This position corresponds to an intermediate position of the spindle 19, in which both the caster wheel 17 is rotatable and the caster wheel fork 16 is swingable.

If the blocking position of the caster-wheel fork 16 is to be produced, then the shift cam 7 is turned into the position shown in FIG. 2. The nut 21 of the spindle 19 then engages into the deeper detent niche 8 due to the action of the compression spring 22. In hand with this the disk 32 is moved in upward direction by the spindle 19. If in this position the larger mating tooth is not yet aligned with one of the two tooth gaps 35, then the upper edge of the disk 32 rests against the mating tooth 36. By turning the caster-wheel fork relative to the pin 2, the mating tooth comes into aligned position with one of the two tooth gaps and can then enter into it, as shown in FIG. 2; see also FIG. 6. From said last-mentioned figure it can also be noted that the larger mating tooth 36 extends over the region of two of the mating teeth 37 lying below same, said mating tooth 36 being directed radial to the disk 32. It can furthermore be noted from FIG. 6 that four such mating teeth 37 are present on the extension 39.

If it is desired to brake the caster wheel 17 while simultaneously blocking the swivel motion of the caster-fork 16, then the shift cam 7 should be turned in counterclockwise direction out of its intermediate position shown in FIG. 1. This is limited by the stop 10 which strikes against the mating stop 12 on the plug-in sleeve. In this way the spindle 19 is shifted further in downward direction via the circumferential surface of the stop 11. The braking surface F of the brake nut 28 comes against the circumferential surface of the caster wheel 17. At the same time, the disk 32 is pushed downward by the compression spring 33, the teeth 34 which are provided on the edge on the bottom broad surface of disk 32 engaging with the mating teeth 37 of the caster-wheel fork 16. If the caster wheel 17 has decreased in diameter as a result of wear, then the effective length of the spindle 19 can be adjusted by means of the screw thread. This does not interfere with the engagement between the mating teeth 37 and the teeth 34 of the disk 32. Since the mating teeth 37 extend over a larger arc than the arc of the tooth gap 35, disk 32, despite displacement, cannot move below the mating teeth 37 and fail to cause a blocking of the swivel motion of the caster-wheel fork.

In the case of the second embodiment, shown in FIGS. 7–10, the same parts bear the same reference numbers. Differing from the first embodiment, the impact surface 40 is developed on a frustoconical nut 28' which is screwed with a large amount of friction on the threaded pin 27. The frustoconical surface forms teeth 41. These teeth cooperate with a toothing 42 on a brake lever 44 mounted between the fork arms 16" close to the fork head plate 16' around a transverse pin 43. The bottom side of lever 44 is the braking F1. In contradistinction to the previous embodiment, impact surface 40 and braking surface F1 are accordingly separated from each other. The brake lever 44 bears a bracket 45 for two mating teeth 46 above its transverse pin 43.

In this embodiment, the disk 32' is provided at its edge with teeth 34 exclusively on the broad disk surface facing the mating teeth 46. All teeth 34 are identical to each other. There are no larger tooth gaps in this case.

The bracket 45 for the mating teeth 46 can also be fastened to the bottom of the fork head plate 16'.

In accordance with FIG. 7, the upper end 21' of the nut 21 is shown in the deep detent niche 8. The toothed disk 32' does not enter into toothed engagement with the mating teeth 46 nor does the impact surface 40 of the nut 28 come against the brake lever 44 so that the caster wheel 17 is rotatable and the caster-wheel fork 16 is swingable.

Figure 9:
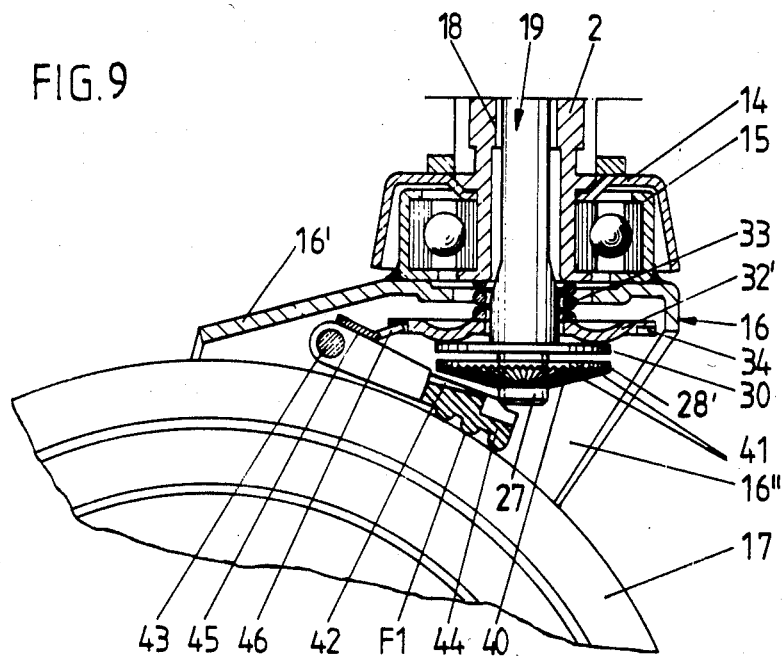
FIG. 9 is a partial longitudinal section through the caster device, only the swivel motion of the caster-wheel fork being blocked.
Figure 10:
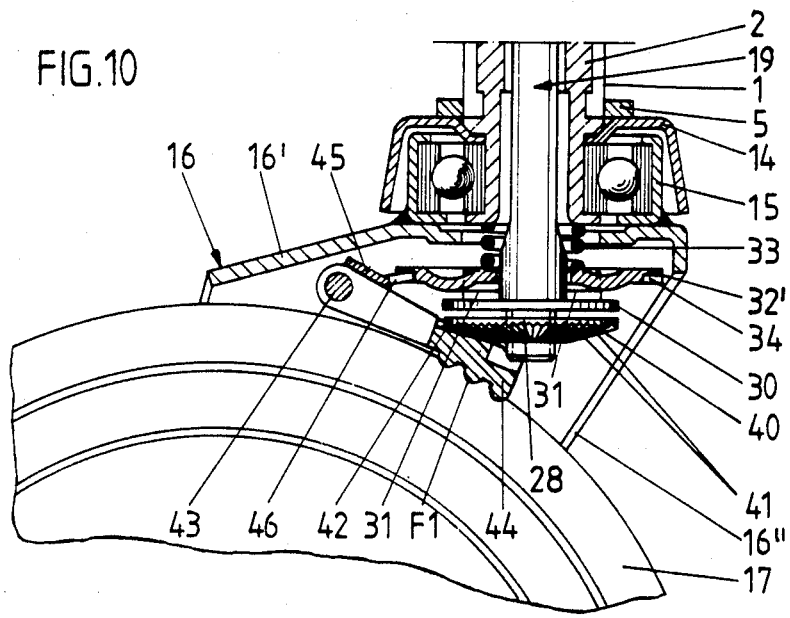
FIG. 10 is a showing corresponding to FIG. 9 in which both the rotation of the caster wheel and the swiveling of the caster-wheel fork are blocked.

If the shift cam 7 is turned so that the spindle 19 then cooperates with the detent niche 9, this causes a downward displacement of the spindle 19, together with the disk 32', into the position shown in FIG. 9. The mating teeth 46 can now extend into the edge teeth 34 of the disk 32', blocking the swivel motion of the caster-wheel fork 16. The rotation of the caster wheel 17 is not impaired since the impact surface 40 of the nut 28' has not yet reached the brake lever 44.

Figure 4:
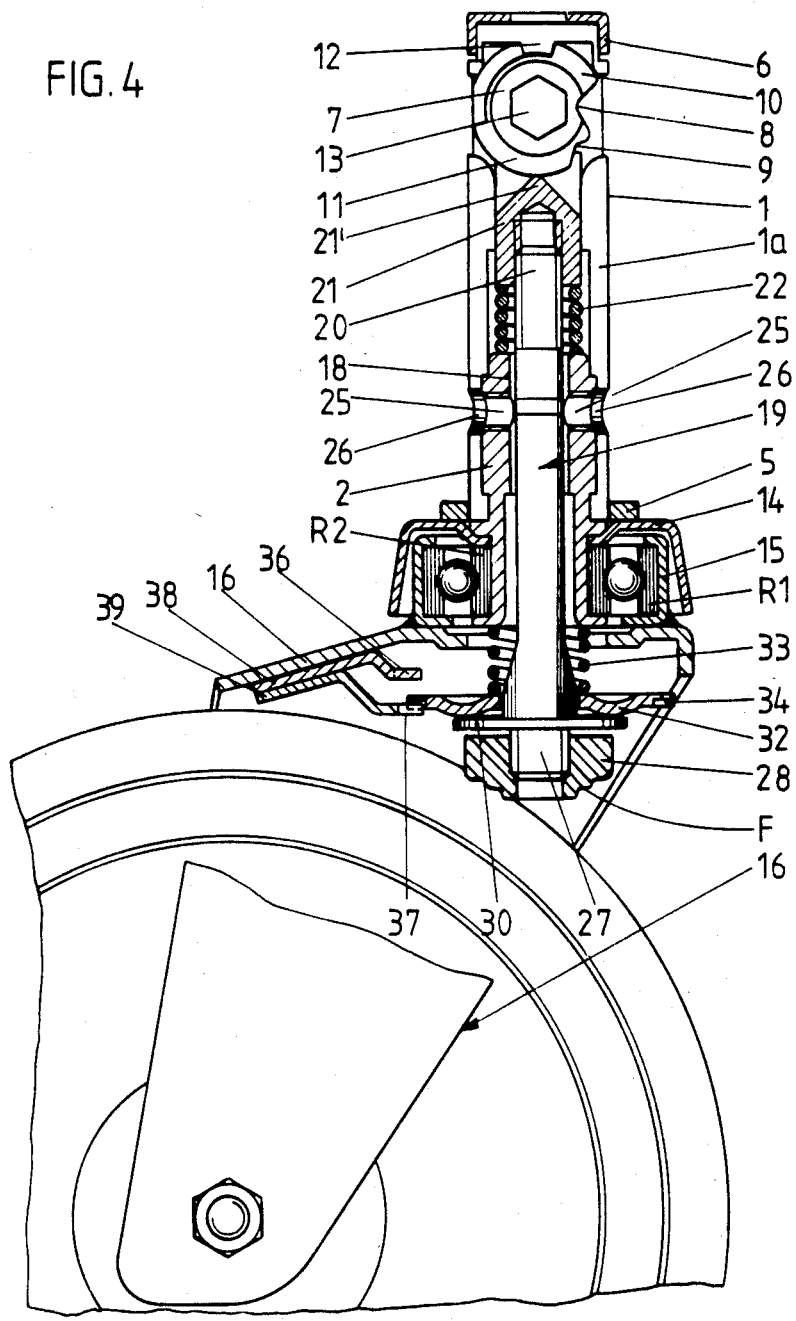
FIG. 4 is also a longitudinal section corresponding to FIG. 1, both the swivel motion of the caster-wheel fork and the rotation of the caster wheel being blocked.
Figure 5:
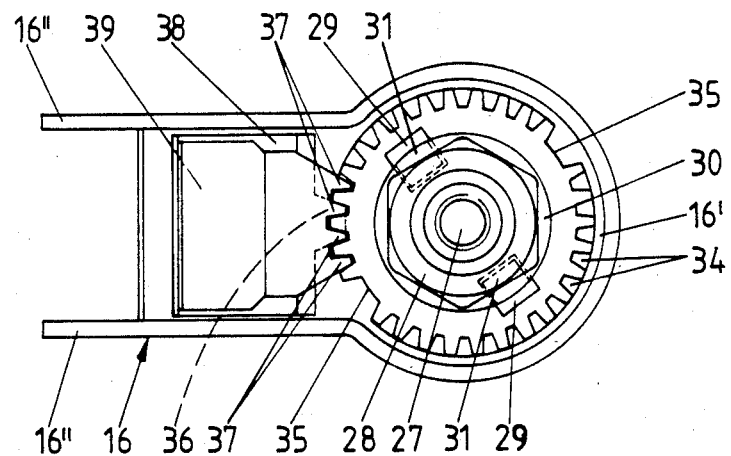
FIG. 5 is a bottom view of a spindle assembly of FIG. 1.
Figure 6:
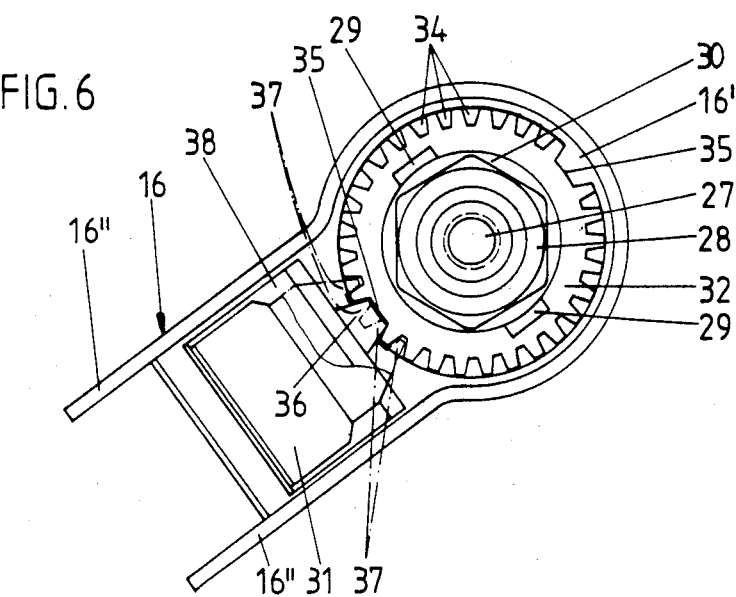
FIG. 6 is a bottom view of a spindle in blocking position of the caster-wheel fork of FIG. 2.

In order to produce the non-rotatability of the caster wheel 17 as well as the blocking of the swivel motion of the caster-wheel fork 16, the shift cam 7 must be turned further corresponding to the position of the shift cam shown in FIG. 4. In that way the spindle 19 is moved further downward; see FIG. 10. The teeth 41 of the impact surface 40 engage into the toothing 42 of the brake lever 44 and at the same time press the brake lever 45 into brake application position against the circumferential surface of the caster wheel 17. The teeth 34 of the disk 32' remain in this connection in toothed engagement with the mating teeth 46 although a slight relative displacement can take place between disk 32' and impact surface 40. The form lock between collar 30 and disk 32' is not eliminated so that the blocking is not impaired despite this relative movement.

Figure 11:
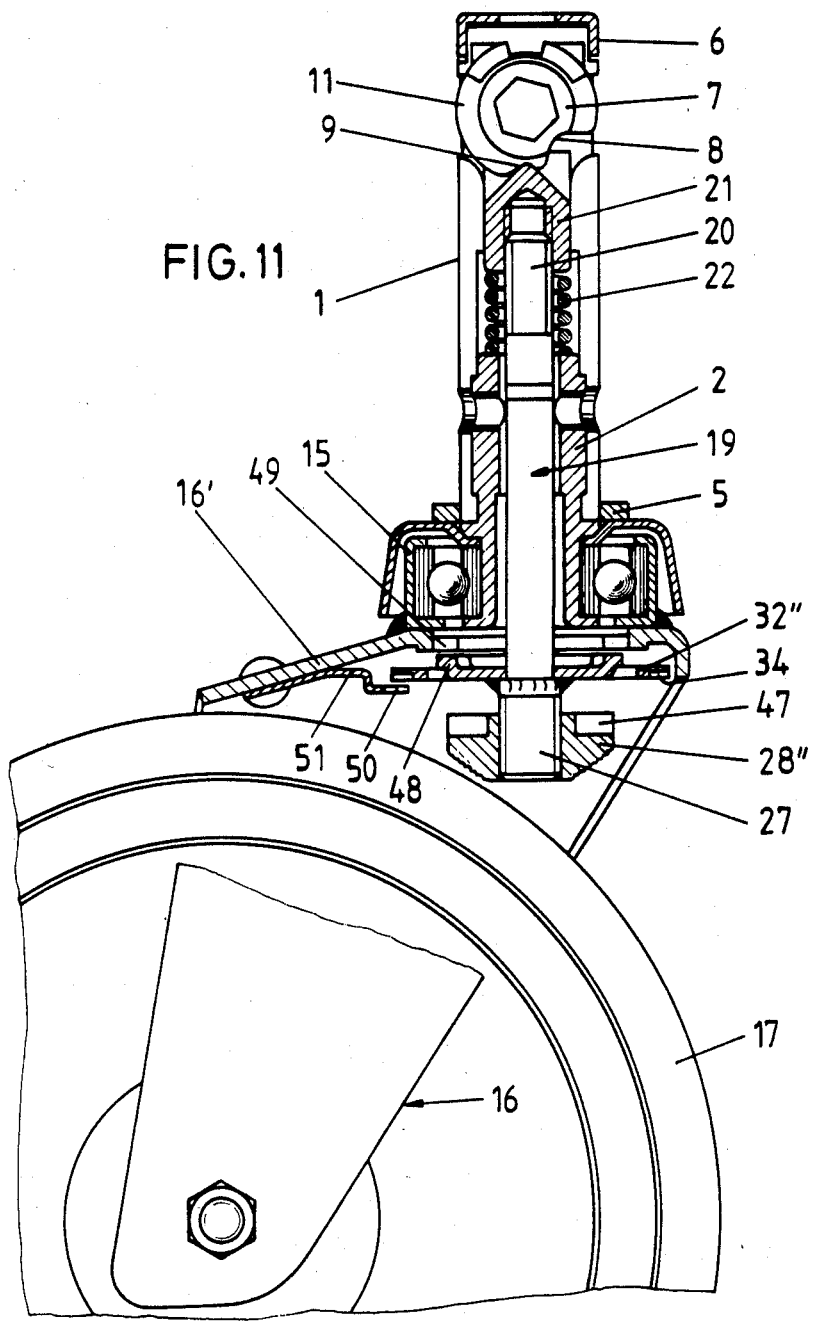
FIG. 11 is a longitudinal section through the caster device according to the third embodiment, in the position of release.
Figure 12:
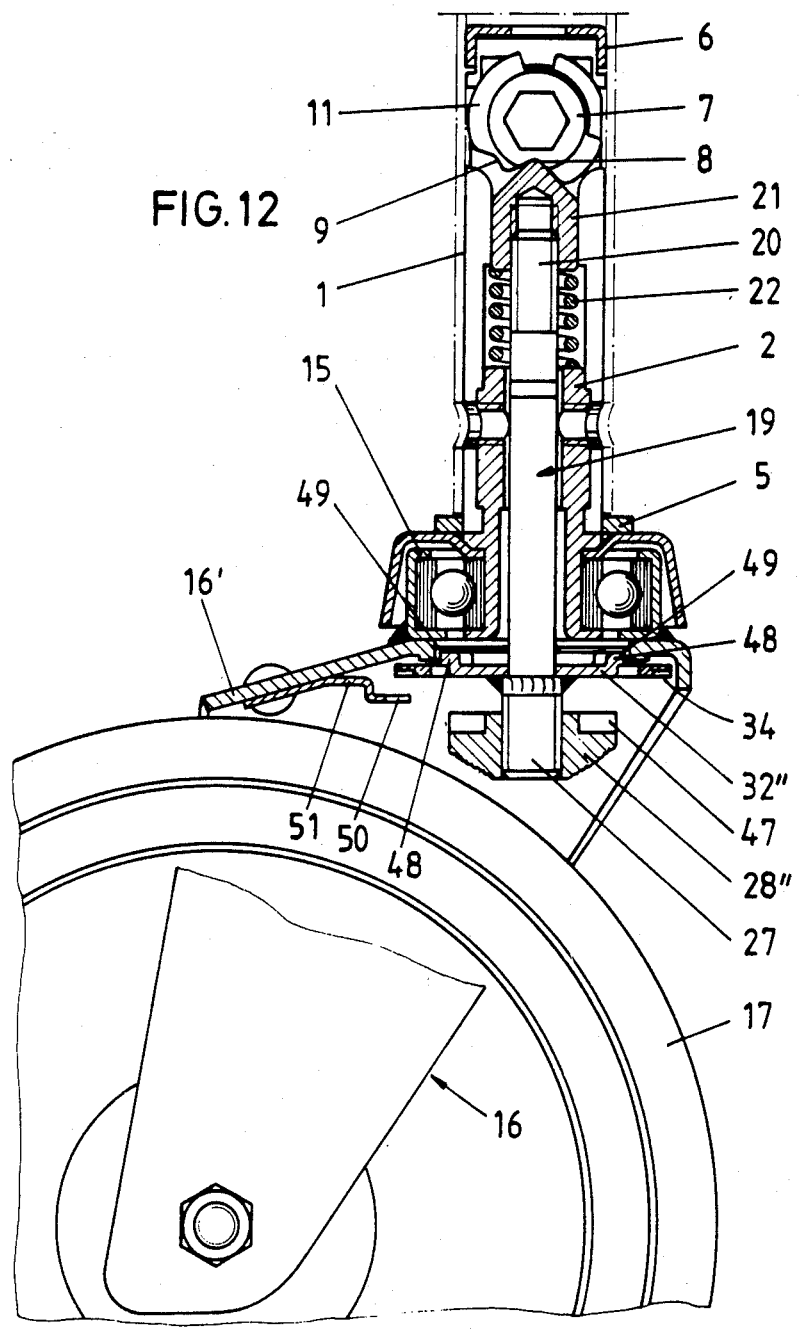
FIG. 12 is a view corresponding to FIG. 11 but in the position of the fork blocked in rough angular graduation.
Figure 13:
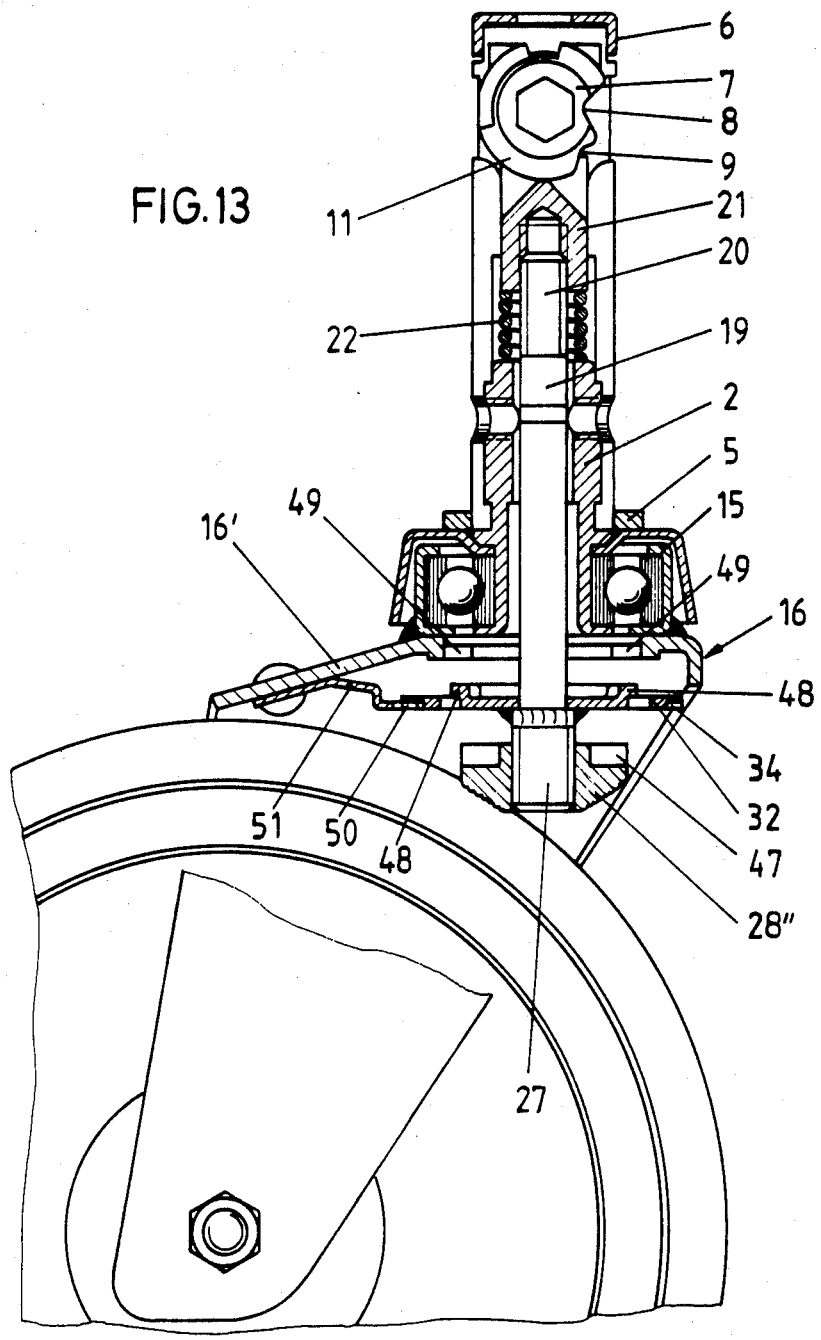
FIG. 13 is a showing also corresponding to FIG. 11 but in the position of the fork blocked in fine angular graduation.

In the third embodiment, shown in FIGS. 11–13, the same structural parts also bear the same reference numbers. The disk 32" is now fixed to the spindle 19. On the other side of the disk 32" the spindle 19 continues downward into the threaded pin 27 and bears on the latter a brake nut 28" which is provided with radially directed engagement openings 47 for the displacement tool. From disk 32" two diametrically opposite teeth 48 are pressed out which protrude above the top broad side of the disk 32" and cooperate with two correspondingly arranged tooth gaps 49 in the fork head plate 16'.

The teeth 34 on the edge of the lower bottom broad of the disk 32" are overlapped by mating teeth 50 which in their turn are seated on a resilient strap 51 which is fastened to the bottom of the head plate 16'.

In the released position shown in FIG. 11, the nut 21 of the spindle 19 engages into the detent niche 9 of the shift cam 7. The tooth engagement means of the disk 32" are not in engagement in this position.

If the position of the blocking of the swivel motion shown in FIG. 12 is brought about, the nut 21 extends into the detent niche 8 of the shift cam 7. The spindle 19 can thus move further upward so that it is possible for the teeth 48 of the disk 32' to enter into the tooth gaps 41 of the head plate. If they are not yet aligned with the teeth 48 then, upon the turning of the disk 32", they come into the corresponding aligned position and are brought into the blocking position via the compression spring 22. Accordingly, two blocked rough fork positions can be obtained.

In accordance with FIG. 13, by the swinging of the shift cam 7 both the rotation of the caster wheel 17 and the swivel motion of the caster-wheel fork 16 are blocked. In this position of the shift cam the spindle 19 moves further downward. The mating teeth 50 on the resilient strap 51 engage into the teeth 34 of the disk 32" and remain there as a result of spring action while the brake nut 28 presses against the outer surface of the caster wheel 17. This blocking position of the caster-wheel fork occurs in finer angular graduation due to the larger number of teeth 34.

I claim:

1. In a caster device with blocking of rotation of a caster wheel and of swiveling of a caster-wheel fork by displacement of a spindle which is disposed concentric to the swivel axis of the caster-wheel fork, the spindle being displaceable along the axis and passing through a head plate of the fork and a mounting plate disposed above the head plate; and wherein the spindle adjacent a lower end of the spindle carries a disk provided with teeth, the spindle upon displacement to a first position blocks swiveling of the caster-wheel fork by toothed engagement of the disk therewith and, after another displacement to a second position, blocks rotation of the caster wheel by means of a braking action of an impact surface, the latter being located at the lower end side of the spindle and adjustable separately from the disk in a depth of engagement, the improvement wherein said teeth of said disk being formed as pockets which are open towards the bottom of the disk and at the periphery but closed at the top of said disk, said head plate has a circular shape adjacent which said disk is disposed, said disk having an outer diameter substantially equal to that of said circular shape, said head plate has an inclined portion extending radially away from said circular shape, an extension member inside said fork mounted on said fork under the inclined portion of said head plate for toothed engagement with said disk, said extension member is formed with a segment having at least one mating tooth at an outer edge of the extension member pointing toward and in overlapping position with respect to said teeth of said disc so as to engage with the teeth of the disk by longitudinal movement of the disk along an axis of said spindle and by slight swiveling movement of the fork.

2. The caster device as set forth in claim 1, wherein said disk is located on the fork-head plate side of the impact surface, the disk being provided at its edge with the teeth which are bringable into engagement with the at least one mating tooth which is disposed in a fixed relation to said fork; and the engagement of said teeth is accomplished in a released position of the caster wheel.

3. The caster device as set forth in claim 2, wherein said released position is an intermediate position between said first position of the caster-wheel fork and the second position of the spindle which blocks both rotation of the caster wheel and swiveling of the caster-wheel fork.

4. The caster device as set forth in claim 2, wherein said at least one mating tooth comprises mating teeth, said extension member having two levels of said mating teeth, the two levels of said mating teeth being arranged on different planes, located on above the other.

5. The caster device as set forth in claim 4, wherein said disk has a tooth gap between said teeth of said disk, and the mating teeth are arranged at different levels and the mating teeth at the different levels differ in shape from each other in the manner that a larger one of the mating teeth is provided at one of the levels and is bringable into engagement for blocking the swiveling of the caster-wheel fork by being brought into the tooth gap, the latter having an inside engagement space corresponding to a multiple of the space taken up by the other ones of said mating teeth at another of said levels.

6. The caster device as set forth in claim 5, wherein the inside engagement space of the tooth gap for the larger mating tooth is open radially and axially on said disk.

7. The caster device as set forth in claim 2, wherein said spindle has a collar, the disk rests against said collar of the spindle, and means for biasing said disk by spring action in a direction towards the impact surface.

8. The caster device as set forth in claim 1, wherein said disk is movable by displacement of said spindle into two blocking positions of the swiveling located on two sides of a position of release from blocking the rotation of the caster wheel and the swiveling of the caster-wheel fork, one of sid blocking positions blocks the swiveling of the fork in coarse angular graduation and the other of which blocks the swiveling of the fork in finer angular graduation, said two blocking positions constitute said first and second positions.

9. The caster device as set forth in claim 1, wherein the disk is provided on both opposite wide surfaces thereof with said teeth thereof, and the caster-wheel fork has tooth engagement gaps on said head plate engageable with corresponding of said teeth, and said extension member comprises a resilient strap disposed below said tooth engagement gaps and having said at least one mating tooth which overlaps the teeth of said disk.

10. The caster device as set forth in claim 1, further comprising a brake nut arranged adjustable by a thread on the lower end side of the spindle, said brake nut is formed with said impact surface.

11. The caster device as set forth in claim 1, wherein said extension member comprises a lever pivoted to said fork, and a bracket mounted on said lever, the mating teeth being formed on said bracket.

* * * * *